W. B. HUGHES.
CIRCUIT CONTROLLING DEVICE.
APPLICATION FILED JAN. 20, 1911.
1,016,268.
Patented Feb. 6, 1912.
2 SHEETS—SHEET 2.
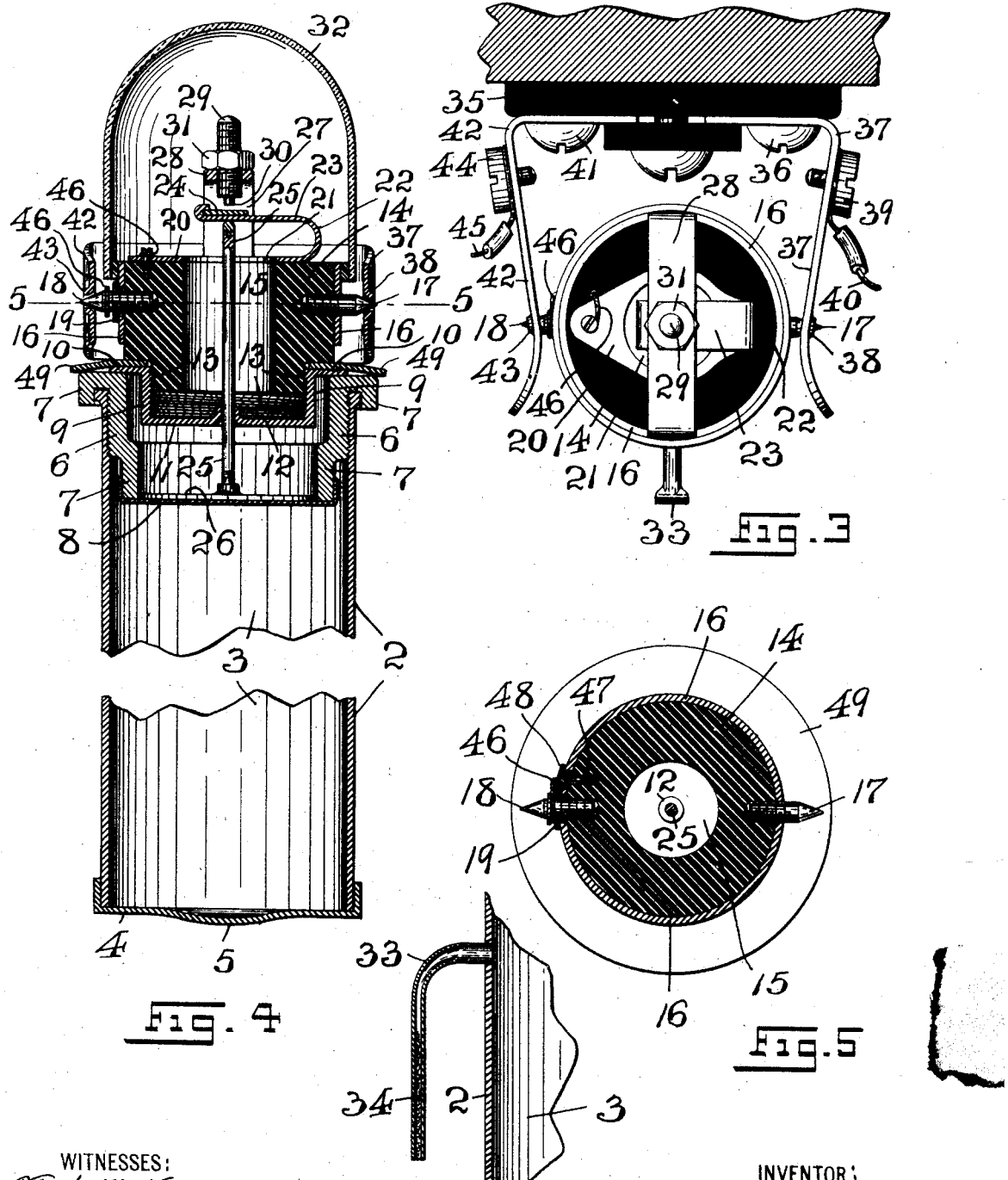
WITNESSES:
INVENTOR:
William B. Hughes,
BY
Fraentzel and Richards,
ATTORNEYS

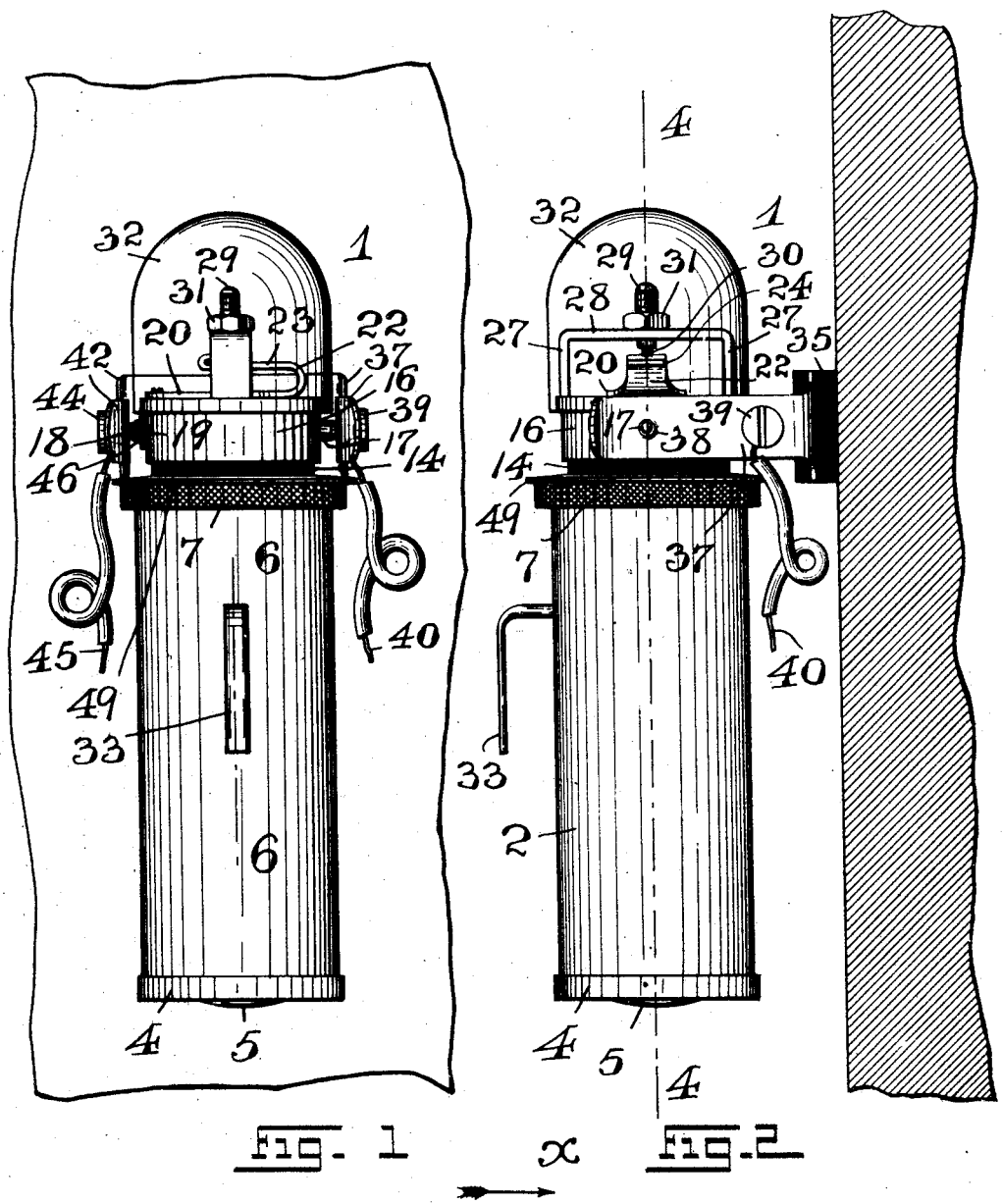

UNITED STATES PATENT OFFICE.

WILLIAM B. HUGHES, OF NEWARK, NEW JERSEY.

CIRCUIT-CONTROLLING DEVICE.

1,016,268.        Specification of Letters Patent.        Patented Feb. 6, 1912.

Application filed January 20, 1911. Serial No. 603,697. REISSUED.

*To all whom it may concern:*

Be it known that I, WILLIAM B. HUGHES, a citizen of the United States, residing at Newark, in the county of Essex and State of New Jersey, have invented certain new and useful Improvements in Circuit-Controlling Devices; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to improvements in electric fire-alarms or heat indicating devices; and, this invention has reference, more particularly, to a novel device or apparatus which is automatic in its operation in closing an electric circuit to sound an alarm, when the said device or apparatus is subjected to abnormal heat, but which maintains the said electric circuit interrupted or broken under a wide variation or fluctuation of normal temperature.

The present invention, therefore, has for its principal object to provide a novel and simply constructed device or implement, which normally maintains an electric circuit interrupted or broken; but, which in case of fire, or the generation of excessive or sudden heat, is caused to act automatically to close said electric circuit, whereby an alarm, as a bell, or the like, may be sounded to give warning, or by means of which suitable sprinkler-devices may be set in operation. The said device or apparatus may be used also in connection with any well-known types of alarms and indicators, so that in large buildings the exact location of the fire, or the abnormal condition of temperature may be readily ascertained.

Another object of the present invention is to provide a simple, neat, small, and inconspicuous construction of device of the character herein-above set forth, which may be placed in rooms, or other places, as a fire-protective accessory, the same being easily adjusted and arranged in its operative condition.

A further object of the present invention is to provide a means for testing the said novel devices, when the same are installed so as to assure that the electrical connections and alarms connected therewith are in perfect working order and condition.

Other objects of this invention not at this time more particularly enumerated will be clearly understood from the following detailed description of my present invention.

With the various objects of my present invention in view, the invention consists, primarily, in the novel device or apparatus of the general character hereinafter more fully specified; and, the invention consists, furthermore, in the novel arrangements and combinations of the various devices and parts, as well as in the details of the construction of the same, all of which will be more fully described in the following specification and then finally embodied in the clauses of the claim which are appended thereto, and which form an essential part of the said specification.

The invention is clearly illustrated in the accompanying drawings, in which:—

Figure 1 is a front elevation or face view of the novel device or apparatus embodying the principles of the present invention; and Fig. 2 is a side elevation of the same. Fig. 3 is a top end view of said novel device or apparatus, the same being drawn upon an increased scale; and Fig. 4 is a longitudinal vertical section taken on line 4—4 in said Fig. 2, looking in the direction of the arrow *x*, the same being drawn upon an increased scale. Fig. 5 is a detail horizontal section, taken on line 5—5 in said Fig. 4, looking downwardly; and Fig. 6 is a detail longitudinal vertical section, taken on line 6—6 in said Fig. 1.

Similar characters of reference are employed in all of the hereinabove described views, to indicate corresponding parts.

Referring now to the several figures of the drawings, the reference-character 1 indicates one embodiment of a complete device or apparatus made according to the principles of the present invention, the same comprising a hollow cylindrical body-portion 2, said portion providing an air-chamber 3. Said cylindrical body-portion 2 is permanently closed at its lower end with a suitably arranged closure, as 4, which is provided with a suitable buckle or bulge 5, the purpose of which will be subsequently more particularly set forth. The upper and open end of said cylindrical body-portion 2 is interiorly threaded, so as to receive the threaded portion 6, of diaphragm-carrier 7, and secured in any suitable manner upon the inner end of said diaphragm-carrier, so as to stretch across the open end thereof, is a diaphragm-member 8. Said diaphragm member may be constructed of any desirable or suitable material, although it has been demonstrated in practice, that some very tough and thin material, such as goldbeater's skin, provides a diaphragm-member of considerable toughness combined with a requisite degree of sensitiveness. Secured in any suitable manner in the upper end of said diaphragm-carrier 7 is an interiorly threaded socket-member 9, which is provided with an annular flange 10, by means of which it is connected with the said diaphragm-carrier 7. Said socket-member 9 is provided in its wall 11 with a centrally disposed bearing or guide-portion 12. Secured in said socket-member 9, by means of its screw-threaded hub or boss 13, is an insulator-block 14, adapted to support in proper electrical arrangement certain circuit-closing elements. Said insulator-block 14 is preferably constructed of any suitable material which is a non-conductor of electricity, and the same is provided with a vertically extending and centrally disposed longitudinal opening or passage 15, and suitably secured upon the vertical side of said insulator-block 14 is an annular metallic band or collar 16. Secured in said insulator-block 14 is a pivot-stud 17, the same passing through said band or collar 16 and projecting outwardly therefrom, said pivot-stud 17 being permitted to make a direct contact with said band or collar 16, so as to establish an electrical conductive relation between the several parts. Secured in said insulator-block 14, and upon the directly opposite sides thereof, is another pivot-stud 18 which passes through said band or collar 16, but is insulated from electrical contact therewith by means of a flanged insulator-sleeve 19. Secured upon the upper surface of said insulator block 14 is a contact-plate 20, the same being provided with a suitable opening or perforation 21 which registers above the mouth of said opening or passage 15 in said insulator-block 14. Said contact-plate 20 is provided with a turned-over portion 22 forming a spring-arm 23, upon the upper side of the free end of which is arranged a contact-piece 24, preferably made of platinum, and slidably arranged in said bearing or guide-portion 12 of the socket-member 9 is a rod or stem 25, the upper and free end of said rod or stem 25 engaging the under-side of said spring-arm 23. Secured to the lower end of said rod or stem 25 is a diaphragm-disk 26 which rests normally upon and in engagement with said diaphragm-member 8. Connected with the upper marginal edge of said collar or band 16 are the upwardly extending supporting arms 27 of a bridge-piece 28, and adjustably mounted in said bridge-piece 28 is a screw-threaded stud 29, which carries upon its lower end a contact-making point 30, adapted to receive, under proper conditions, the contact of said contact-piece 24 carried by said spring-arm 23. Arranged upon said screw-threaded stud is a lock-nut 31 for locking the same in a desired adjusted position.

If desired, a suitable glass or other dust-protector-cap 32 may be arranged over the contact-making device herein-above described. The said cylindrical body-portion 2 is also provided with a vent-pipe 33, which connects with the air-chamber 3, and if desired, the passage or duct of said air-vent pipe 33 may be supplied with a packing 34, of any desirable fibrous material, the same being adapted to permit a slow filtration of air in either direction through said vent-pipe 33, but being adapted to check or obstruct any sudden or quick passage of air therethrough, as will be clearly evident. The means for supporting said cylindrical body 2 and the contact-making elements connected therewith comprises the following devices:—Secured to a wall, or other desirable place, is an insulator-block 35, and connected with said insulator-block 35, by means of a screw 36, or any other suitable fastening means, is a spring-bracket or arm 37, the same being provided with a receiving socket or perforation 38 adapted to receive in both supporting arrangement and electrical contact said pivot-stud 17. The said spring-bracket or arm 37 is provided with a screw 39, or other suitable device, providing a binding post for the attachment thereto of the one wire 40 of an electrical alarm or other circuit. In like manner, there is connected with said insulator-block 35, by means of a screw 41, or any other suitable fastening means, another spring bracket or arm 42, the same being insulated from electrical contact with said first-mentioned spring bracket or arm 37. Said spring bracket or arm 42 is provided with a receiving socket or perforation 43 adapted to receive in both supporting arrangement and electrical contact the said pivot-stud 18, said spring-bracket or arm 42 being provided with a screw 44, or other suitable device, in the form of a binding-post for the attachment thereto of a wire 45 of an electrical alarm or other circuit. Electrical connection is established between the said pivot-stud 18 and spring bracket or arm 42 and said contact-plate 20 by means of a wire-conductor 46 which passes through a suitable hole or passage 47 in said insulator-block 14, the same being insulated from contact with said band or collar 16 by means of a suitable insulator-sleeve 48. Connected between said insulator-block 14 and the cylindrical body-portion 2 is a suitable washer 49 which extends outwardly over the upper end of the said body-portion 2, and the connected parts adjacent thereto, said washer 49 being made preferably of an insulating material and serving to prevent any accidental electrical contact of said body-portion or said adjacent parts with the respective spring-brackets or arms 37 and 42.

The operation of the alarm-device hereinabove described is accomplished in the following manner:—When the device is subjected to excessive or a sudden rising of temperature, the heat in striking the cylindrical body 2, raises the temperature of the same and thereby suddenly expands the air contained in the air-chamber 3. The expansion of the air in said air-chamber 3 causes an upward and outward bulge of the diaphragm-member 8 which is communicated to the diaphragm-disk 26 and its rod or stem 25, the latter being caused to transmit an upward lift to said spring-arm 23 which brings in contact with said contact-point 30, the contact-member 24, whereby the alarm or other circuit is operatively closed, as will be clearly understood. The sensitiveness of the contact-closing devices may be regulated by adjusting said contact-point 30, in a manner which will be apparent from an inspection of the drawings.

The cylindrical body 2 is provided with said air-vent pipe 33 which communicates with said air-chamber 3, the purpose of said vent-pipe being to provide a means for compensating the air-pressure in said air-chamber 3, during the course of the normal fluctuations of temperature, which fluctuations are generally slow or gradual in change. For example, as the temperature rises slowly, the air which is in said air-chamber 3 will expand, but it will slowly escape through said vent-pipe with sufficient celerity to compensate or relieve any extraordinary or abnormal pressure upon the said diaphragm-member 8. The same is true upon the contraction of air in said air-chamber which is due to the lowering or falling temperature, the air in which case being sucked through said air-vent pipe and into said air-chamber to maintain the normal pressure. By thus providing a means for equalizing, or compensating the fluctuations of the air-pressure, due to gradual changes of temperature, the said diaphragm-member is prevented from causing a closing of the contacts in the alarm-circuit under normal conditions, but, under abnormal conditions, the said diaphragm member will quickly and surely perform its functions.

It will be noticed that said cylindrical body 2 is provided in its bottom portion with the bulge 5, which, when pressed by the fingers, suddenly compresses the air in the air-chamber 3, thus causing an operation of the diaphragm-member 8 and a closing of the contact-devices herein-above described, such operation affording a simple and efficient means of testing the operativeness of the device and its proper electrical connection and operation in an alarm or other electrical circuit, as will be clearly evident.

While the above device is shown and described in an arrangement whereby an electrical circuit, normally broken, may be closed, nevertheless the same may be arranged so as to reverse this operation, in other words, the same may be arranged to break a normally closed circuit, without departing from the scope of my present invention.

I am aware that changes may be made in the general arrangements and combinations of the various devices and parts, as well as in the details of the construction of the same, without departing from the scope of the present invention as set forth in the foregoing specification, and as defined in the claims which are appended to the said specification. Hence, I do not limit my invention to the exact arrangements and combinations of the said devices and parts as described in the said specification, nor do I confine myself to the exact details of the construction of the said parts as illustrated in the accompanying drawings.

I claim:

1. A device for automatically closing an electric circuit when subjected to excessive or sudden heat, comprising a hollow body providing an air-chamber, a diaphragm-member connected at one end of said body and in communication with said air-chamber, normally separated contact-devices arranged above said body and electrically connected in an alarm or other electric circuit, means operated by said diaphragm-member for closing said normally separated contact devices, and means for compensating the normal fluctuations of air-pressure in said air-chamber caused by normal fluctuations of temperature, and a closure-member provided with a bulge at the bottom of said hollow body for quickly compressing the air in said air-chamber, to operate said diaphragm-member, substantially as and for the purposes set forth.

2. A device for automatically closing an electric circuit when subjected to excessive or sudden heat, comprising a hollow body providing an air-chamber, a diaphragm-member connected at one end of said body and in communication with said air-chamber, a receiving socket in the upper end of said body above said diaphragm-member, an insulator-block supported by said receiving-socket, a contact-plate, a spring-arm carrying a contact-piece connected with said contact-plate, an adjustable contact-point supported above said spring-arm, a pivot-stud connected with said insulator-block and electrically connected with said adjustable contact-point, a second pivot-stud connected with said insulator-block and electrically connected with said contact plate and its spring-arm, a pair of spring-brackets engaging said pivot-studs in supporting relation, said spring-brackets being electrically insulated one from the other, but in electrical contact with their respective pivot-studs, means for connecting said spring-brackets in an alarm or other circuit, and means coöperating with said diaphragm-member for closing the contact of said spring-arm with said contact-point, substantially as and for the purposes set forth.

3. A device for automatically closing an electric circuit when subjected to excessive or sudden heat, comprising a hollow body providing an air-chamber, a diaphragm-member connected at one end of said body and in communication with said air-chamber, a receiving socket in the upper end of said body above said diaphragm-member, an insulator-block supported by said receiving socket, a contact-plate, a spring-arm carrying a contact-piece connected with said contact-plate, an adjustable contact-point supported above said spring-arm, a pivot-stud connected with said insulator-block and electrically connected with said adjustable contact-point, a second pivot-stud connected with said insulator-block and electrically connected with said contact-plate and its spring arm, a pair of spring-brackets engaging said pivot-studs in supporting relation, said spring-brackets being electrically insulated one from the other, but in electrical contact with their respective pivot-studs, means for connecting said spring-brackets in an alarm or other circuit, means coöperating with said diaphragm-member for closing the contact of said spring-arm with said contact-point, and an air-vent pipe connected with said hollow body and in communication with said air-chamber for compensating the normal fluctuations of air pressure in said air-chamber, substantially as and for the purposes set forth.

4. A device for automatically closing an electric circuit when subjected to excessive or sudden heat, comprising a hollow body providing an air-chamber, a diaphragm-member connected at one end of said body and in communication with said air-chamber, a receiving socket in the upper end of said body above said diaphragm-members, an insulator-block supported by said receiving socket, a contact-plate, a spring-arm carrying a contact-piece connected with said contact-plate, an adjustable contact-point supported above said spring-arm, a pivot-stud connected with said insulator-block and electrically connected with said adjustable contact-point, a second pivot-stud connected with said insulator-block and electrically connected with said contact-plate and its spring-arm, a pair of spring-brackets engaging said pivot-studs in supporting relation, said spring-brackets being electrically insulated one from the other, but in electrical contact with their respective pivot-studs, means for connecting said spring-brackets in an alarm or other circuit, means coöperating with said diaphragm-member for closing the contact of said spring-arm with said contact-point, and an air-vent pipe connected with said hollow body and in communication with said air-chamber for compensating the normal fluctuations of air-pressure in said air-chamber, and a closure-member provided with a bulge at the bottom of said hollow body for quickly compressing the air in said air-chamber to operate said diaphragm-member, substantially as and for the purposes set forth.

5. A device for automatically closing an electrical circuit when subjected to excessive or sudden heat, comprising a hollow body providing an air-chamber, a diaphragm-member connected at one end of said body and in communication with said air-chamber, a receiving socket in the upper end of said body above said diaphragm-member, an insulator-block supported by said receiving socket, a contact-plate, a spring-arm carrying a contact-piece connected with said contact-plate, an adjustable contact-point supported above said spring-arm, a pivot-stud connected with said insulator-block and electrically connected with said adjustable contact-point, a second pivot-stud connected with said insulator-block and electrically connected with said contact-plate and its spring-arm, a pair of spring-brackets engaging said pivot-studs in supporting relation, said spring-brackets being electrically insulated one from the other, but in electrical contact with their respective pivot-studs, means for connecting said spring-brackets in an alarm or other circuit, means coöperating with said diaphragm-member for closing the contact of said spring-arm with said contact-point, comprising a diaphragm-disk in contact with said diaphragm-member, a rod or stem extending upwardly therefrom and through a bearing-portion with which said receiving socket is provided and a hole or opening with which said insulator block is provided, the upper end of said rod or stem being in contact with said spring-arm of said contact-plate, substantially as and for the purposes set forth.

6. A device for automatically closing an electrical circuit when subject to excessive or sudden heat, comprising a hollow body providing an air-chamber, a diaphragm-member connected at one end of said body and in communication with said air-chamber, a receiving socket in the upper end of said body above said diaphragm-member, an insulator-block supported by said receiving socket, a contact-plate, a spring-arm carrying a contact-piece connected with said contact-plate, an adjustable contact-point supported above said spring-arm, a pivot-stud connected with said insulator-block and electrically connected with said adjustable contact-point, a second pivot-stud connected with said insulator-block and electrically connected with said contact-plate and its spring-arm, a pair of spring-brackets engaging said pivot-studs in supporting relation, said spring-brackets being electrically insulated one from the other, but in electrical contact with their respective pivot-studs, means for connecting said spring-brackets in an alarm or other circuit, means coöperating with said diaphragm-member for closing the contact of said spring-arm with said contact-point, comprising a diaphragm-disk in contact with said diaphragm-member, a rod or stem extending upwardly therefrom and through a bearing-portion with which said receiving socket is provided and a hole or opening with which said insulator block is provided, the upper end of said rod or stem being in contact with said spring-arm of said contact-plate, and an air-vent pipe connected with said hollow body and in communication with said air-chamber for compensating the normal fluctuations of air pressure in said air chamber, substantially as and for the purposes set forth.

7. A device for automatically closing an electric circuit when subjected to excessive or sudden heat comprising a hollow body providing an air-chamber, a diaphragm member connected at one end of said body and in communication with said air-chamber, a receiving socket in the upper end of said body above said diaphragm-member, an insulator-block supported by said receiving socket, a contact-plate, a spring arm carrying a contact-piece connected with said contact-plate, an adjustable contact-point supported above said spring-arm, a pivot-stud connected with said insulator-block and electrically connected with said adjustable contact-point, a second pivot-stud connected with said insulator-block and electrically connected with said contact-plate and its spring-arm, a pair of spring-brackets engaging said pivot-studs in supporting relations, said spring-brackets being electrically insulated one from the other, but in electrical contact with their respective pivot-studs, means for connecting said spring-brackets in an alarm or other circuit, means coöperating with said diaphragm-member for closing the contact of said spring-arm with said contact-point, comprising a diaphragm-disk in contact with said diaphragm-member, a rod or stem extending upwardly therefrom and through a bearing-portion with which said receiving socket is provided and a hole or opening with which said insulator block is provided, the upper end of said rod or stem being in contact with said spring-arm of said contact-plate, an air-vent pipe connected with said hollow body and in communication with said air-chamber for compensating the normal fluctuations of air-pressure in said air chamber, and a closure-member provided with a bulge at the bottom of said hollow body for quickly compressing the air in said air-chamber to operate said diaphragm member, substantially as and for the purposes set forth.

8. A device for automatically closing an electric circuit when subjected to excessive or sudden heat comprising a hollow body providing an air-chamber, a diaphragm-member connected at one end of said air-chamber, means for supporting an insulator-block above said diaphragm-member, a diaphragm-disk arranged in connection with said diaphragm-member, an upwardly extending rod or stem connected with said diaphragm-disk, the same passing through a hole or opening with which said insulator-block is provided, a contact-plate carried by said insulator-block, a spring-arm carrying a contact-piece connected with said contact-plate, a bridge-member carried by said insulator-block, and an adjustable contact-point carried by said bridge-member, means for supporting said insulator-block and said hollow body and at the same time connecting in an alarm or other circuit said contact-plate and its spring-arm, and said bridge-member and its adjustable contact-point, substantially as and for the purposes set forth.

9. A device for automatically closing an electric circuit when subjected to excessive or sudden heat comprising a hollow body providing an air-chamber, a diaphragm-member connected at one end of said air-chamber, means for supporting an insulator-block above said diaphragm-member, a diaphragm-disk arranged in connection with said diaphragm-member, an upwardly extending rod or stem connected with said diaphragm-disk, the same passing through a hole or opening with which said insulator-block is provided, a contact-plate carried by said insulator-block, a spring-arm carrying a contact-piece connected with said contact-plate, a bridge-member carried by said insulator-block, an adjustable contact point carried by said bridge-member, means for supporting said insulator-block and said hollow body and at the same time connecting in an alarm or other circuit said contact-plate and its spring arm, and said bridge member and its adjustable contact-part, and an air-vent pipe connected with said hollow body and in communication with said air-chamber for compensating the normal fluctuations of air pressure in said air-chamber, substantially as and for the purposes set forth.

10. A device for automatically closing an electric circuit when subjected to excessive or sudden heat comprising a hollow body providing an air-chamber, a diaphragm-member connected at one end of said air-chamber, means for supporting an insulator-block above said diaphragm-member, a diaphragm-disk arranged in connection with said diaphragm-member, an upwardly extending rod or stem connected with said diaphragm-disk, the same passing through a hole or opening with which said insulator-block is provided, a contact-plate carried by said insulator-block, a spring-arm carrying a contact-piece connected with said contact-plate, a bridge-member carried by said insulator-block, an adjustable contact point carried by said bridge-member, means for supporting said insulator-block and said hollow body and at the same time connecting in an alarm or other circuit said contact-plate and its spring-arm, and said bridge-member and its adjustable contact-point, an air-vent pipe connected with said hollow body and in communication with said air-chamber for compensating the normal fluctuations of air pressure in said air-chamber, and a closure-member provided with a bulge at the bottom of said hollow body for quickly compressing the air in said air-chamber to operate said diaphragm-member, substantially as and for the purposes set forth.

11. A device for automatically closing an electric circuit when subjected to excessive or sudden heat comprising a hollow body providing an air-chamber, a diaphragm-member connected at one end of said air-chamber, means for supporting an insulator-block above said diaphragm-member, a diaphragm-disk arranged in connection with said diaphragm-member, an upwardly extending rod or stem connected with said diaphragm-disk, the same passing through a hole or opening with which said insulator-block is provided, a contact-plate carried by said insulator-block, a spring-arm carrying a contact-piece connected with said contact-plate, a bridge-member carried by said insulator-block, an adjustable contact point carried by said bridge-member, means for supporting said insulator-block and said hollow body and at the same time connecting in an alarm or other circuit said contact-plate and its spring-arm and said bridge-member and its adjustable contact-point, comprising a pair of insulated spring-brackets, each provided with means for connecting the same in said alarm-circuit, pivot-studs connected with said insulator-block, and engaging said respective spring-brackets, means for electrically connecting one of said pivot-studs with said bridge-member and said adjustable contact-point, and means for electrically connecting the other of said pivot-studs with said contact-plate and its spring-arm, substantially as and for the purposes set forth.

12. A device for automatically closing an electric circuit when subjected to excessive or sudden heat comprising a hollow body providing an air-chamber, a diaphragm-member connected at one end of said air-chamber, means for supporting an insulator-block above said diaphragm-member, a diaphragm-disk arranged in connection with said diaphragm-member, an upwardly extending rod or stem connected with said diaphragm-disk, the same passing through a hole or opening with which said insulator-block is provided, a contact-plate carried by said insulator-block, a spring-arm carrying a contact-piece connected with said contact-plate, a bridge-member carried by said insulator-block, an adjustable contact point carried by said bridge-member, means for supporting said insulator-block and said hollow body and at the same time connecting in an alarm or other circuit said contact-plate and its spring-arm, and said bridge-member and its adjustable contact-point, comprising a pair of insulated spring-brackets, each provided with means for connecting the same in said alarm-circuit, pivot-studs connected with said insulator-block, and engaging said respective spring-brackets, means for electrically connecting one of said pivot-studs with said bridge-member and said adjustable contact-point, and means for electrically connecting the other of said pivot-studs with said contact-plate and its spring-arm, and an air-vent pipe connected with said hollow body and in communication with said air-chamber for compensating the normal fluctuations of air pressure in said air-chamber, substantially as and for the purposes set forth.

13. A device for automatically closing an electric circuit when subjected to excessive or sudden heat comprising a hollow body providing an air-chamber, a diaphragm-member connected at one end of said air-chamber, means for supporting an insulator-block above said diaphragm-member, a diaphragm-disk arranged in connection with said diaphragm-member, an upwardly extending rod or stem connected with said diaphragm-disk, the same passing through a hole or opening with which said insulator-block is provided, a contact-plate carried by said insulator-block, a spring-arm carrying a contact-piece connected with said contact-plate, a bridge-member carried by said insulator-block, an adjustable contact point carried by said bridge-member, means for supporting said insulator-block and said hollow body and at the same time connecting in an alarm or other circuit said contact-plate and its spring-arm and said bridge-member and its adjustable contact-point, comprising a pair of insulated spring-brackets, each provided with means for connecting the same in said alarm-circuit, pivot-studs connected with said insulator-block, and engaging said respective spring-brackets, means for electrically connecting one of said pivot-studs with said bridge-member and said adjustable contact-point, and means for electrically connecting the other of said pivot-studs with said contact-plate and its spring-arm, an air-vent pipe connected with said hollow body and in communication with said air-chamber for compensating the normal fluctuations of air pressure in said air-chamber, and a closure-member provided with a bulge at the bottom of said hollow body for quickly compressing the air in said air-chamber to operate said diaphragm-member, substantially as and for the purposes set forth.

In testimony, that I claim the invention set forth above I have hereunto set my hand this 18th day of January, 1911.

WILLIAM B. HUGHES.

Witnesses:
 GEORGE D. RICHARDS,
 MAYBELLE McADOO.

Copies of this patent may be obtained for five cents each, by addressing the "Commissioner of Patents, Washington, D. C."